Sept. 24, 1946.  A. D. GARRISON ET AL  2,408,207

TREATMENT OF CLAYS

Filed Nov. 6, 1941

ALLEN D. GARRISON
KARL C. TEN BRINK
*INVENTORS*

BY

R. J. Dearborn
Daniel Stryker
THEIR *ATTORNEYS*

Patented Sept. 24, 1946

2,408,207

UNITED STATES PATENT OFFICE 2,408,207

TREATMENT OF CLAYS

Allen D. Garrison and Karl C. ten Brink, Houston, Tex., assignors to Texaco Development Corporation, New York, N. Y., a corporation of Delaware Application November 6, 1941, Serial No. 418,030

12 Claims. (Cl. 252—301)

This invention relates to the improvement of clays. More specifically, it relates to improvements in the processes of treating natural clays whereby the adsorptive capacity of the clay is substantially increased and whereby the efficiency of the clay for various uses is materially improved. Among such uses are the decolorization of liquids such as vegetable, animal and mineral oils, and the catalytic promotion of various reactions. Clays prepared in accordance with the invention are particularly useful in cases where the efficiency of the action of a clay is directly or indirectly related to the adsorptive capacity and wherein the value of the clay may be improved by an increase in its adsorptive capacity.

Clays found in some selected localities are naturally endowed with relatively high surface area and with an open or spongy texture which permits ready access of materials in solution or in the gaseous state. Such natural adsorptive capacity seems to have been the result of a certain specialized history of the clay in nature, whereby its chemical nature, its high surface area, and its open texture were all properly adjusted.

Other clays, more abundant in distribution, do not have the adsorptive capacity already well developed. Apparently their natural history lacks some procedures which would render their chemical nature, their surface area, or their texture suitable for efficient adsorption.

Clays are fundamentally alumino-silicates containing different amounts of other materials. Their compositions are usually expressed in terms of the percentage of each metallic element expressed in the form of its oxide. Thus the composition of a sample of a Texas sub-bentonite was found to be as follows:

|   | Per cent |
|---|---|
| $SiO_2$ | 57.66 |
| $Al_2O_3$ | 19.59 |
| $Fe_2O_3$ | 4.92 |
| $CaO$ | 4.05 |
| $MgO$ | 3.32 |
| $H_2O$ | 9.54 |
| $Na_2O$ | Small |
| $K_2O$ | Small |

The above analysis was conducted on the dry sample which had lost 8.18 per cent water at 105° C. It is recognized that the metals do not exist in the clay as mixed oxides. The above clay was characteristic of many clays which may be converted into adsorptive clays in that an analysis by the X-ray method revealed that its structure was that of montmorillonite and therefore it is an example of a class of clays that are termed clays of the montmorillonite type. In this structure, the silicon and aluminum atoms lie in planes bound together by oxygen links. The other metals such as Fe, Ca, Mg, may be either chance metallic substitutes for the aluminum or silicon in the regular atomic arrangement of the crystal sheets, or they may be simply adsorbed and partly exchangeable or replaceable ions loosely attached at the surfaces or edges of the crystal sheets. The metals contained in clays, other than silicon and aluminum, are regarded as exchangeable bases, although in certain cases these metals at least partly are tightly bound in the clay structure and form a non-exchangeable portion. By acid treatment these bases together with some aluminum may be removed at least partly from the clay, the clay thereby being converted into an acid clay and usually of increased $SiO_2$ content.

A clay of this type is commonly classified as an activable clay; i. e., a clay which in its natural state is not a satisfactory decolorizing agent for oils but which upon acid treatment is converted to an active decolorizing agent. Fuller's earths are distinguished from the activable clays in that fuller's earths are active in the natural state and do not respond satisfactorily to acid activation. Also, the fuller's earths are susceptible of manufacture into granular grades for percolation; while the activable clays, because of the difficulties in obtaining a satisfactory granular product, are prepared commercially only in the pulverized grade.

As appears from the foregoing discussion, the activable clays contain the mineral, montmorillonite, and probably have a volcanic origin. Accordingly, they are bentonitic in character, but since they are distinct from true bentonites such as Wyoming bentonite, which are not activatible and which have the property of swelling in water; whereas, the activable clays merely slake in this medium, they are frequently termed "sub-bentonites." (See "Industrial Minerals and Rocks," Seeley W. Mudd Series, first edition, The American Institute of Mining and Metallurgical engineers, New York, 1937, pp. 135 to 148.)

While the above description discloses an example of what is connoted by the term "clay," it also explains the impossibility of defining the term in exact chemical compositions and the impossibility of expressing the effect of processes which are designed to improve the clay in terms of chemical composition or in terms of changes in chemical composition. The adsorptive capacity of the clay is dependent on its ability to bind certain materials to its surface. It is clear that the surface composition is important, and that one clay may have a better surface than another because of its composition.

But we have learned through extensive research that at least two other properties of the clay are vital to its value. The first is the extent of the area, which must be relatively high in order that much material may be attached to it in the adsorbing process, and, second, its texture must be open enough to permit the materials being adsorbed from the liquid or gaseous state to pass through the aggregates of minute crystals to the surface. We have determined that certain clays may have the desirable surface quality as well as the desirable surface area, but possess a texture so compact, with openings leading into the structure so small, that adsorption is retarded. The material which is to be adsorbed possesses molecules either too large to enter such a structure at all, or large enough to obstruct the rapid diffusion of the material into the surface area.

Furthermore, in the use of a clay as a catalyst or as a catalytic carrier, it is sometimes found that the products of the reaction accumulate in the pores of the solid clay granules. For continued use, the clay must be repeatedly cleaned and regenerated. Although the surface of the clay may have the required quality, and although the area may be exceptionally well developed, it is possible that the pores leading to this area may be so small that they are easily obstructed. Thus the active catalytic life would be low and the speed of cleaning and regeneration retarded.

It is an object of this invention to provide a new and improved method of increasing the porosity of the clay, as well as the extent of the available area while at the same time retaining or increasing the desirable surface qualities which depend upon the natural composition.

In describing the improvements, it is desirable to present the results of controlled adsorption measurements in order that the improvements may be properly evaluated without reference to too limited conditions of use, and without reference to any range of fixed compositions as expressed by chemical analysis.

Such controlled adsorption measurements may be advantageously presented in the form of an adsorption isotherm. An adsorption isotherm is a graphical representation of the amount of a material adsorbed at constant temperature as a function of the pressure of the vapor (or the concentration of a solution) of the material being adsorbed. It is now customary to use some vapor for this measurement wherein the dimensions of the molecules are known, so that it is possible to estimate, from the adsorption isotherm, both the area of the surface of the adsorbing material and the distribution and sizes of the pores. There are various mathematical formulae available for such an estimation. One which is rather recent and general in its application is described by Brunauer, Emmett and Teller in the Journal of the American Chemical Society, volume 60, page 309, 1938; and by Brunauer, Deming, Deming and Teller in the Journal of the American Chemical Society, volume 62, page 1723, 1940. This method was used in our work to make quantitative estimates of the increases in area and porosity derived from our processes. Another method of quantitative evaluation of the porosity of an adsorbing material is the older and well-known equation of Thomson, Philosophical Magazine (London), volume 42 (4), page 448, 1871, which expresses the amount of vapor adsorbed in the larger capillaries of a porous solid in terms of the sizes of the pores.

Without quantitative calculations, and without reference to whether the improvement is primarily due to increasing the area or due to increasing the porosity (size of the pores) of the clay, it is evident from an inspection of the amount of material adsorbed under specified conditions that the processes which we disclose materially increase the adsorbing capacity of the clay. Adsorption isotherms using benzene vapor at various pressures and at 30° C. are therefore presented in the drawing for purposes of disclosing the improvements which result from our process as compared with those usually attained by methods which have heretofore been used to increase the capacity of clay.

We have discovered in accordance with the invention that clays, and particularly clays of the montmorillonite type, can be improved by a process comprising increasing or extending and cleaning the available area of the clay and then preserving the increased or extended available adsorptive area. We have found that this process may be carried out by first dispersing the clays in water under conditions such that the degree of dispersion and extent of separation of the minute colloidal crystal sheets (primary particles) of the clay are substantially greater than the degree of dispersion and extent of separation of a simple dispersion of the clay in water. While the clay is in the dispersed condition, undesirable materials, such as sand, silt, and non-colloidal grains of such materials as feldspar and calcium carbonate and sulfate whose surfaces are not capable of high development, may be removed. Adsorbed or exchangeable bases are also preferably removed while the clay is extended due to the dispersing action, and it is one of the features or advantages of the invention that such bases, particularly the alkali and alkaline earth metals such as sodium, potassium, and calcium may be easily and substantially completely eliminated by the present process.

The dispersion and extension of the area of the clay are preferably carried out so as to accomplish in addition the hydration of the clay. We have found that by incorporating in the clay while wet and in the highly dispersed and hydrated state a highly dispersed or colloidal inorganic compound, a finished clay is produced having markedly improved adsorptive capacity. In speaking of highly dispersed or colloidal inorganic compounds, it is intended to include materials which are obtained as highly dispersed gelatinous precipitates as well as perfect examples of gels. However, since the difference between these classes of compositions is merely based upon the proportion retained of the liquid in which the compound was dissolved, and there is no clear line of demarcation between them, these highly dispersed or colloidal materials will be referred to herein generically as inorganic gels. Especially important examples of such gels are highly dispersed or colloidal inorganic oxides, particularly silica gel and alumina gel.

One method of extending and cleaning the available area of the clay, comprises treating the clay in very fine state with mineral acids. The action of the acid promotes the separation of the aggregated grains of clay (secondary particles) into smaller particles (primary crystals) having more extended area. The acid also removes some of the alumina, iron oxide, and bases from the grains, so that even if a complete dispersion of the primary crystals is not attained in the acid, the texture of the grains becomes more open and the porosity and area are increased. If acid-treated clay is to be used for decolorizing purposes in oils, it is common practice to wash it almost free of acid and contact it with the oil in a wet state at such a temperature that the water is flashed off the clay and the oil contact is made before the clay has had an opportunity to become compact and nonporous. Thus, it is a well known fact that many acid-treated clays are more active decolorizing agents when they are used wet, than when they are dried before contacting with the oil. This additional activity of the clay which is associated with its use in the slurry form is partly due to the fact that a relatively large adsorptive area is developed during the acid treatment. This development of area results partly from the separation of the colloidal primary crystals from their original aggregates. If the clay is used in the slurry form, this additional area is available, but if the clay is dried before use as an adsorbent, reformation and shrinking of aggregates renders certain areas inaccessible to the material being adsorbed.

We have discovered that the introduction of a small amount of a highly colloidal or gelatinous inorganic oxide into the clay after its surface has been extended by acid treatment makes it possible to preserve the more highly developed area, for adsorptive purposes, even after the clay is dried.

When acid treating is used to accomplish the dispersion, to be most effective it should be conducted on finely ground clay. The clay should pass 100 mesh screen, and better results are obtained if the clay is even finer.

A second method of accomplishing the extension and cleaning of the area of the clay may be used either alone or combined with acid treating. This comprises dispersing the clay in an alkaline aqueous solution above a pH of approximately 8.5. This treatment is preferably carried out in the presence of some acid radicals which precipitate insoluble calcium and magnesium salts. Thus, a clay may be dispersed with sufficient alkali metal carbonate, such as sodium carbonate, to render the clay alkaline at least to a pH of 8.5 and to cause the precipitation of a substantial part of the exchangeable calcium and magnesium ions as carbonates. The clay is thus converted into an alkaline clay. Dispersion and hydration are promoted, and are favored further by heat, time and violent agitation.

We have discovered that the addition of a small amount of highly colloidal or gelatinous inorganic oxide to the alkaline dispersion of the clay followed by the removal of the alkaline ions and the conversion of the clay into an acid clay as by electrodialysis or by reaction with acids, yields a product having superior adsorbing capacity.

In addition to improved adsorbing capacity, it is possible to employ our invention to improve another quality of the clay. For example, we have obtained preparations of clay having particle size distribution which is more suitable for commercial use, combined with good adsorbing qualities. This combination is not obtained by the usual methods of activating clays. It is common knowledge that the use of treating methods which yield an easily washable and easily filterable clay, for example, one having particles in the range from 100 to 200 mesh or larger, also yields a clay whose adsorptive capacity is reduced. The activation of finer clay, namely that passing 300 mesh on down to colloidal sizes, yields a more adsorptive clay, but one wherein the problems of handling, washing, filtration or settling are greatly complicated and delayed.

We have discovered in accordance with the invention that the greatly extended adsorbing capacity and the larger particle size may be incorporated into the same clay. By partially drying a mixture of water and a clay having an extended area and satisfactory porosity, for example, to a water content of not less than 30 per cent, rigid but porous aggregates are formed. These aggregates may be ground, screened, or extruded to the desired particle size, for example above 200 mesh or above 100 mesh. We have found that these particles may be treated with an acid to remove exchangeable bases and convert the clay into an acid clay. We prefer to carry out this last step by treating the particles with a relatively strong acid such as a mineral acid of at least 35 per cent strength, e. g., 40 per cent sulfuric acid, desirably at temperatures in the neighborhood of room temperature, and then treating the particles with weaker acid, such as sulfuric acid of about 25 per cent concentration or less, at a higher temperature. Thus, in a final stage the particles may be treated with hot dilute acid; e. g. boiling 10 per cent sulfuric acid.

One way of obtaining these results consists of dispersing the clay in sodium carbonate at a pH in excess of 8.5, incorporating a highly dispersed or gelatinous inorganic oxide into the dispersed clay and then partly drying the product to cause the reformation of rigid but highly porous aggregates. These aggregates may then be broken up to the desired sizes and acid treated under conditions to preserve the aggregates, whereby a product is obtained having enhanced adsorbing qualities, together with desirable particle sizes.

The following examples of the operation of our invention are given by way of illustration. In order to provide a basis for comparison, two samples of the clay used in the examples, a Texas sub-bentonite, were taken and treated in the following manner. The first sample was dispersed in water and was found to have a natural pH of approximately 5.6, indicating that the clay already partly converted into an acid clay in nature. This sample was washed and dried and the adsorption isotherm for benzene at 30° C. was determined. This appears in the drawing as curve A of Figure 1.

Since this clay is one which is commonly used for decolorizing petroleum oils after it has been subjected to a treatment which consists of dispersion in water, screening and treatment with sulfuric acid of 8 per cent concentration at the boiling temperature for six hours, the second sample was treated in this way and was then washed and dried. This sample will be referred to hereinafter as sample X. The benzene adsorption isotherm was then determined and appears in the drawing as curve B of Figure 1.

*Example 1*

120 grams of caustic soda was added to 3 kilograms of the Texas sub-bentonite after mixing with water. This addition of caustic brought the pH of the clay slurry to approximately 10.5, where the clay was converted into the sodium clay. The clay was permitted to disperse and hydrate for 8 days, and was then cleaned of non-colloidal matter by centrifuging. This eliminated the impurities of sand, silt, calcium sulfate and carbonate, and clay aggregates which are not subject to high dispersion. The wet and dispersed clay was permitted to hydrate further for several weeks, and was then subjected to the action of added 10 per cent hydrochloric acid for 6 hours at the boiling temperature. The treated clay was then washed free of electrolytes and dried. The result was a very fine powder which had no tendency to cake, and which was readily redispersed in water. A solution of sodium silicate ($Na_2SiO_3$) was then prepared in 10 per cent concentration and carbon dioxide gas was introduced into the solution. When the pH had been lowered to near the neutral point, the appearance of turbidity indicated that the separation of colloidal silica gel was imminent. The acid treated clay was then quickly introduced into the turbid solution and dispersed throughout by violent stirring. A silica gel formed in the presence of the highly dispersed clay in an amount sufficient to yield 20 per cent of the final dry mixture. After thorough mixing and gelling, the liquid was filtered off and the soluble material was completely removed by electrodialysis of the wet mixture. After the complete removal of the electrolytes, the clay was dried and heated to a temperature of 540° C. for a short time. The benzene adsorption isotherm of the clay is presented in Figure 1 as curve No. 1.

The adsorbing capacity of the clay was improved somewhat by the preliminary alkaline dispersion and cleaning of the clay prior to the treatment with acid, as well as by the use of hydrochloric acid in place of the usual commercial sulfuric acid. Therefore, a sample of the same clay was prepared in the same way as Example 1, except that the addition of the dispersed silica was omitted, and the acid treated clay was washed first with dilute hydrochloric acid, then with water. It was then dried at 120° C., washed free of chlorine ions and again dried at 120° C. The adsorption characteristics are presented in curve No. 1a, Figure 1.

Figure 1:
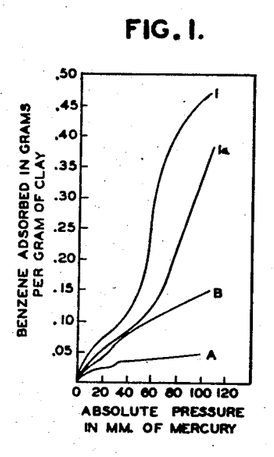

By comparing the amounts of benzene adsorbed by the four preparations, curves A, B, 1, and 1a, Figure 1, at various pressures of benzene vapor, it is possible to get some quantitative information regarding the improvements herein disclosed, and it is also possible to learn with reasonable certainty the cause of the observed improvement.

While we do not wish to be bound by quantitative interpretations and theories of action, it is desirable to point out that the quantitative interpretation of the above isotherms by the methods indicated above leads us to believe that our improvements are to some extent due to an increase in the available area of the finished clay, and to a large extent due to an opening of the texture of the clay aggregates, and providing more pores of sizes which favor high adsorption.

We believe that the clays are composed of colloidal crystals whose sizes may range from $10^{-6}$ of a centimeter up to $10^{-3}$ of a centimeter as indicated by the nature of the X-ray diffraction pattern. These colloidal crystals have extensive areas suitable for adsorptive purposes, but in their natural state they are aggregated together in more or less firm secondary particles which resist dispersion in water and which contain such small pores and spaces between the colloidal crystals that the adsorptive area of the individual colloidal crystals is not available. The adsorption curve No. A, Figure 1, of the natural clay indicates that many of the pores are so small that they are completely filled with one layer of benzene molecules. We believe that the usual acid treatment of such a clay opens up the structure in at least two ways, namely by releasing some of the bound colloidal crystals from their original aggregate, and by removal of some of the soluble material of the aggregates, thus enlarging both the area exposed and the sizes of the pores. A part of the effect of this acid action is destroyed by washing and drying the clay, during which process we believe that the aggregates reform and the pores shrink with some loss of available adsorptive capacity.

We believe that our improved process has a distinct advantage over the processes heretofore used in that it preserves the open texture of the clay and not only retains the adsorptive area, but provides spaces between the colloidal primary particles where additional adsorption can occur in the manner of a secondary or tertiary molecular layer, or in the manner of capillary condensation. We believe that the silica dispersion added to the acid-treated clay in Example No. 1 while the clay was still hydrated and highly dispersed served to space the colloidal crystals at greater distances during the final drying process.

Example 2

Figure 2:
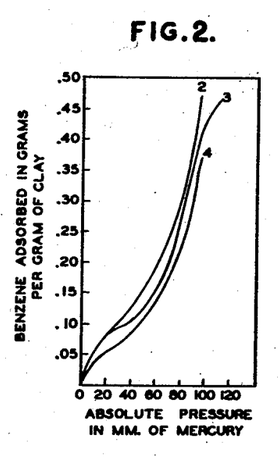

This clay had a similar history and received a series of treatments identical to the Example No. 1 up to and including the reaction of the clay with 50 per cent of its weight of hydrochloric acid in a concentration of 10 per cent in water at the boiling point for six hours. This treatment caused the solution of a substantial fraction of the alumina and iron oxides of the clay. It is estimated that about one-half of the total alumina and iron oxide content of the clay entered solution in the acid as aluminum and iron chlorides. The slurry of highly dispersed acid treated clay, containing the spent acid, was neutralized and rendered slightly alkaline by the addition of ammonia to precipitate the metals as highly hydrous and dispersed gelatinous oxides. This alkaline slurry was allowed to age at least 12 hours, and was then washed repeatedly and completely with water to which a trace of ammonia was added. The clay was then dried at 120° C. The adsorption capacity of the clay was evaluated and the results presented in Figure 2, curve 2.

It is clearly shown that the adsorption capacity of this clay sample is increased by the incorporation of the highly hydrous and gelatinous oxides of aluminum and iron in somewhat the same manner as was observed in the case of Example 1 wherein the highly hydrous and dispersed silica was added to the dispersed clay. Thus, the inorganic gels may be formed in situ and out of the materials present in the clays. It is recognized that the chemical natures of the two cases are not the same, and that the clays prepared by the methods of Examples 1 and 2 may have different specific adsorptive and catalytic properties which may make them suitable for different uses. It is therefore emphasized that we do not wish to be limited by the specific applications of these clays or by the exact chemical compositions of the original and improved clays. Our process of improving the adsorptive capacity of clays is simultaneously flexible enough to permit the adjustment of chemical nature and the preparation of clays having better adsorptive properties for varied uses.

Example 3

Another clay was prepared similar to Example

No. 1 up to and including the acid treating process. After the boiling with acid was complete and the slurry cooled, the clay was filtered and suspended in aluminum chloride solution containing enough aluminum to yield $Al_2O_3$ in the amount of 3 per cent of the weight of the finished clay. Ammonium hydroxide was then added sufficient to yield an alkaline condition and precipitate the gelatinous aluminum oxide in the presence of the hydrated and dispersed acid-treated clay. The mixture was aged 48 hours, filtered and washed with dilute ammonia, and dried at 120° C. The adsorption characteristics are presented in Figure 2, curve 3.

*Example 4*

Another clay was prepared similar to Example No. 1 up to and including the acid treatment. The clay was washed free of acid and left wet. A separate preparation of weak silica gel was prepared by mixing dilute sodium silicate with dilute hydrochloric acid. This dispersed gel of silica was also washed free of acid and salts. The dispersed silica gel was then thoroughly mixed with the hydrated and dispersed clay in such an amount to yield 5 per cent of added silica to the clay calculated on the dry basis. The mixture was then dried at 120° C. The adsorption characteristics are presented in Figure 2, curve 4.

*Example 5*

Figure 3:
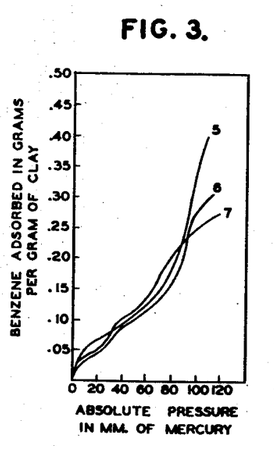

A sample of Texas sub-bentonite was dispersed in water and 4 per cent of sodium carbonate by weight of the clay was added to the slurry. Time was provided for complete dispersion and hydration. Dispersion and deflocculation was further promoted by the addition of .2 per cent of sodium tetraphosphate. The slurry was then passed through a 100 mesh screen, and coarse impurities discarded. Sufficient hydrochloric acid was then added to reduce the pH of the slurry to about 5.5, and then a second addition of acid was made sufficient to react with the sodium oxide content of the sodium silicate which was to be added later. Sodium silicate of molecular ratio $SiO_2/Na_2O$ of 3.86/1 was diluted to a $SiO_2$ content of 10 per cent and was added slowly to the acidified clay while stirring rapidly. Silica gel was formed in the presence of the highly dispersed and hydrated clay in an amount to yield 10 per cent of the final dry clay. The final pH of the gelled mixture was between 6 and 7. This mixture was slowly dried until the water content was 40 per cent. The mixture was still plastic, and was extruded through a 20 mesh screen, and immediately wet with concentrated sulfuric acid in an amount equal to 50 per cent of the weight of the dry clay. The acid was permitted to diffuse into the clay grains, water was then added to just cover the mixture, and heat was applied until the temperature of 80° C. was attained. Water was then added to make an acid concentration of 8 per cent and the mixture boiled for 6 hours. The clay was then washed free of sulfate ions and dried. The drying was continued for 2 hours at 120° C. This clay retained a granular nature throughout the acid treatment, and was exceptionally easy to handle, wash, settle and filter. In addition to having very high adsorptive capacity, it combined the advantages of relatively large particle size and resultant easy commercial handling. The adsorption isotherm using benzene vapor at various pressures and at 30° C. on this sample is presented as curve 5 in Figure 3.

*Example 6*

A sample of Texas sub-bentonite was dispersed with 5 per cent sodium carbonate (based on the weight of the dry clay), and, after some dispersion and hydration, sodium silicate was added to raise the pH further and convert the clay into a highly colloidal sodium clay. The slurry was screened through 100 mesh. A mixture of aluminum sulfate and sulfuric acid (spent acid) was added to reduce the pH to between 2 and 3. About 5 per cent silica gel was added to the clay from the sodium silicate when the clay was acidified in this step. This clay was washed and partly dried. It was then redispersed in water and enough dilute highly hydrous preformed silica gel was added to yield another 5 per cent of the weight of the finished dry clay, or 10 per cent in all. This mixture was then boiled six hours with 25 per cent of the clay weight of sulfuric acid in 4.5 per cent concentration in the liquid medium. The acid treated clay was then washed and dried. The adsorption characteristics as above defined are presented in curve 6, Figure 3.

*Example 7*

A quantity of Texas sub-bentonite was subjected to the same dispersion and screening as was described in the case of Example 5. Sufficient sulfuric acid was added to reduce the pH to about 5, and then a second addition of sulfuric acid calculated to react with the sodium oxide of the sodium silicate to be incorporated later was made. A solution of sodium silicate of molecular ratio $SiO_2/Na_2O$ of 3.22/1 was prepared in concentration such that the $SiO_2$ content was 20 per cent, and was boiled for one hour. This solution was then added slowly to the acidified clay slurry with rapid stirring. The final pH was adjusted to 5.6 where the silica gel formed in the presence of the highly dispersed and hydrated clay. The amount of silica thus added to the clay was 10 per cent based on the dry weight of the clay. This slurry was then slowly dried until its texture was brittle. It was then added to a mixture of aluminum sulfate and sulfuric acid (spent acid) wherein it shattered to granules of about 20 to 40 mesh, with some smaller fragments. The clay was then washed and boiled six hours with sulfuric acid 8 per cent concentration, in an amount equal to 25 per cent of the weight of the dry clay. The clay was then washed free of sulfate ions and dried at 120° C. The clay remained substantially granular during the acid treatment and had a distribution of particle sizes which rendered washing, settling and filtration easy. About one-third of this clay retained grain sizes large enough to rest on a 40 mesh screen, and these grains were tested for adsorption capacity in the usual manner. The adsorption isotherm is presented in curve 7, Figure 3.

*Example 8*

Figure 4:
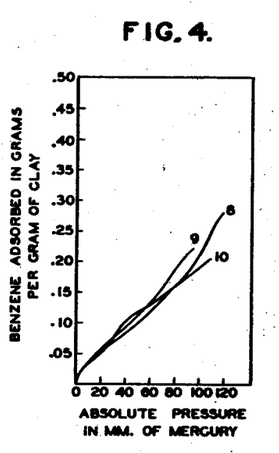

A sample of Texas sub-bentonite was dispersed, hydrated and screened as described in the case of Example 5, and the silica gel was introduced in the same manner. However, in place of stopping the drying at 40 per cent water, the drying was continued until the clay was easily granulated. It was then introduced into a mixture of aluminum sulfate and sulfuric acid (spent acid) in which it shattered to granules of about 40 mesh and smaller. This slurry was washed free of chlorine ions, and treated with 25 per cent of its weight of sulfuric acid in 8 per cent concentration for 6 hours at the boiling point. It was then washed free of sulfate ions and dried at 120° C. The clay remained granular during the acid treatment, and yielded a clay which was subject to easy washing, settling, and filtration. A relatively large part of the clay was still as large as 40 mesh, and these large grains were tested for adsorption capacity in the usual manner. The adsorptive capacity is presented in curve 8, Figure 4. It is again demonstrated that this process yields a clay which is more easily handled by commercial methods while at the same time having an adsorptive capacity in substantial excess of that of the clay which was acid treated by the methods commonly employed.

*Example 9*

A sample of Texas sub-bentonite was dispersed with 5 per cent sodium carbonate (based on the weight of the dry clay), and after some dispersion and hydration, sodium silicate was added to raise the pH further and convert the clay into a highly colloidal sodium clay. The slurry was screened through 100 mesh. A mixture of aluminum sulfate and sulfuric acid was added to reduce the pH to between 5 and 6. It is estimated that about 5 per cent of the weight of the clay as silica gel was added during the flocculation of the sodium silicate with this acid. This flocculated clay was washed and dried to a water content of 45 per cent. This mixture was then broken into lumps of about one-eighth of an inch in diameter, and treated with 25 per cent of the clay weight of 8 per cent concentration sulfuric acid, taking into account the water content of the wet lumps of clay. After six hours at the boiling point, the clay was washed free of sulfate ions and dried at 110° C. The clay remained in lump form, having lump sizes somewhat less than one-eighth of an inch in diameter, and these lumps were tested for benzene adsorption capacity as usual. The adsorption curve is presented in curve 9, Figure 4.

*Example 10*

A quantity of Texas sub-bentonite was dispersed in an aqueous 5 per cent solution of sodium carbonate. When dispersion and hydration had progressed, sodium silicate was added in an amount to yield 5 per cent SiO₂ to the finished clay. The sodium silicate raised the pH higher and further dispersed and hydrated the clay. The slurry was then screened to pass 100 mesh, and a mixture of aluminum sulfate and sulfuric acid (spent acid) was added until the pH of the slurry was about 3. The clay was flocculated and the silica gel was produced from the sodium silicate. The clay was washed, dried and ground to obtain a clay having 75 per cent of its mass between 20 and 80 mesh and 25 per cent through 80 mesh. Sulfuric acid was added to this clay in an amount equal to 25 per cent of the weight of the clay, together with enough water to yield a 40 per cent acid solution. This 40 per cent acid was permitted to remain in contact with the clay for 12 hours. Enough water was then added to yield a 20 per cent acid solution and the mixture heated to 75° C. More water was added to yield 10 per cent acid and the heating continued to the boiling point for 6 hours. The clay was then washed free of sulfate ions and dried. A screen examination gave 71.8 per cent of this dried clay still between the sizes 20 and 80 mesh and the remainder smaller than 80. The procedure of contacting the clay with the relatively strong acid (40 per cent) first, followed by dilution and boiling, is of substantial assistance in maintaining the grain size. Grains of sizes 20 to 40 mesh were chosen for the adsorption test with benzene vapor in the usual manner at 30° C. The results are presented in curve 10, Figure 4.

The relations between the adsorbing capacity of clay and the value of the clay in decolorizing of animal, vegetable or mineral oils is not always a direct one. The surface chemistry of the clay must be right, and a clay which is good for cotton seed oil may not be relatively as good for the higher temperature decolorization and neutralization of acid treated lubricating oils, or vice versa. But in general, two principles apply. First, the surface area of the clay must be well developed. This area is calculable from the benzene adsorption isotherms in the pressure region 0 to 20 millimeters. A qualitative idea of the relative surface areas may be obtained from an inspection of the amount of benzene adsorbed at 14 to 20 millimeters. Such an inspection will disclose that in general the surface areas of the clays treated by our improved process are larger than those usually developed from the same clays by the common activating processes.

The second principle which applies to the correlation of adsorption isotherms with decolorizing processes has to do with the sizes of the pores and their volumes relative to the total volumes of the clay grains. A qualitative idea may be derived from an inspection of the amount of the benzene adsorbed in the near-saturation region of the isotherms, namely the pressures 90 to 118 millimeters of mercury. The samples of clay which adsorb large amounts of vapor in this near-saturation region have relatively large pore volumes, and if this high adsorption extends back into the medium pressure regions, namely 50 to 80 millimeters, there is indication that the pore sizes are smaller than those wherein a rapid decrease of adsorption occurs in the near-saturation region. For example curve 1, Figure 1, and curve 2, Figure 2, each indicate a pore volume which is greatly extended and almost equal, but the pores are smaller in the case of curve 1. The total pore volume of curve B, Figure 1, is about one-third of that of the curves 1 and 2, and indicates that our process is capable of extending the pore volume by at least three fold.

This increase in pore volume is desirable in many decolorizing processes for two reasons: First, it enables a better access to the inner surfaces of the grains of clay by providing larger spaces for the colored materials to enter by diffusion; second, it provides space for the adsorption of multiple layers of colored molecules without blocking the pores completely.

The preparations which we have disclosed are therefore better decolorizing agents in many industrial applications of which the following examples are given:

Cottonseed oil is commonly decolorized by clay, and a method of testing the value of the clay for this purpose has been specified as Rule 275, Section 3 of the National Cottonseed Products Association (1938 and 1939). This test was applied to a number of our improved clays and to a sample of the same clay activated by the usual commercial method; i. e., sample X. The colors of the resulting oils were examined by the use of a double monochromator spectrophotometer. This instrument subjects a beam of light to spectral separation, and passes light of a chosen color (30 micro mu wave band width) through the oil in question. The intensity of the transmitted beam of this light is comparable with some standard transparent body, by means of a photoelectric cell and amplifying system. The standard used in our case was a highly-refined water-white mineral oil. The following table, Table I, presents the results of decolorizing tests, wherein the vertical columns are headed by various wavelengths of the spectrum, and the per cent transmittance relative to the same standard is listed for several of the above clay examples for each color of light. High numbers indicate that the oils approach in quality the water-white standard.

Table I

|  | Wavelength | | | | | | |
| --- | --- | --- | --- | --- | --- | --- | --- |
|  | 380 | 410 | 440 | 470 | 500 | 530 | 560 |
| Sample X | 2.9 | 13.6 | 32.5 | 56.4 | 76.6 | 87.0 | 92.5 |
| Clay of Example No. 5 | 6.9 | 28.1 | 49.0 | 69.7 | 85.6 | 92.8 | 96.5 |
| Clay of Example No. 8 | 5.9 | 22.2 | 43.4 | 65.8 | 83.0 | 91.1 | 95.7 |
| Clay of Example No. 10 | 4.5 | 19.9 | 41.4 | 64.0 | 81.5 | 90.1 | 94.1 |

In each of the cases tabulated in Table I the same oil was decolorized by the Rule 275, Section 3 as described above, except that, due to the high efficiencies of the clays involved, only 2 per cent of the weight of the oil was chosen as the amount of clay to be used in all cases. It is clear that a substantial improvement is derived from the processes herein disclosed, since the higher values of the per cent transmittance for each of the selected colors indicate the clays treated by our improved process remove a larger amount of the colored bodies from the oil. For example, using a wavelength of 410 micro mu, the common commercial activation yielded a clay which bleached the oil to transmit 13.6 per cent as much as the water-white standard, whereas the improved procedure as employed in Example No. 5 yielded a clay which bleached the same oil to transmit 28.1 per cent.

Clays or fuller's earths are frequently evaluated for decolorizing mineral lubricating oils by testing their efficiency on a standard oil which is composed of a blend of naphthene base oils each acid treated and chemically neutralized, one having a viscosity at 100° F. of 300 and the other having a viscosity at 100° F. of 200, the blend so formed that the color of the mixture in the 6-inch Lovibond cell is exactly 300. A sample of clay which is to be evaluated is heated to 800° to 850° F. and screened to pass 100 mesh. Ten grams of the clay are stirred with 100 grams of the oil under specified conditions for one hour at 100° F. The oil is then filtered and examined for color. The same double monochromator spectrophotometer was used to make accurate estimates of the degree of bleaching of the oils by several samples of clay which have been presented as examples in this disclosure, and the results are presented in comparison with those obtained from sample X.

The data are presented in Table II for these 300 pale oil bleaching tests:

Table II

|  | Wavelength | | | | | | |
| --- | --- | --- | --- | --- | --- | --- | --- |
|  | 440 | 470 | 500 | 530 | 560 | 590 | 620 |
| Sample X | 1.4 | 8.9 | 33.3 | 58.7 | 74.8 | 86.1 | 92.0 |
| Clay of Example No. 5 | 1.9 | 15.2 | 45.0 | 70.4 | 83.8 | 92.0 | 96.2 |
| Clay of Example No. 8 | 1.6 | 11.6 | 37.8 | 63.0 | 78.0 | 87.6 | 93.1 |
| Clay of Example No. 8a | 1.0 | 12.8 | 40.9 | 66.9 | 80.9 | 88.8 | 94.2 |

It will be noted that throughout the visible spectrum, the transmittance of the oils bleached by the improved clays exceeds that of the standard commercial clay, although all the preparations are from the same clay deposit.

The sample 8a was prepared by the same procedure as described in Example 8 except that the clay was ground to pass 100 mesh just prior to the treatment with sulfuric acid. The particle sizes were thus reduced, but the clay was easily washed and filtered.

Clays, particularly those of sub-bentonitic character, are frequently used in water slurries to neutralize and decolorize lubricating oils or residuum which have been acid treated. These oils contain sulfuric acid and sulfonates, asphaltic materials which may have come from the original oil or which may form from oxidation, together with other colored bodies. It is customary to test a clay for this commercial use by incorporating it into a slurry with water, the clay being ground to pass 100 mesh if it is not already in a slurry form having such dispersion as a result of acid treating. The oil to be tested is contacted with the slurry and heated until the water is driven from the clay. An inert gas is passed in to avoid oxidation, and the heating continued to a temperature of 500° F. The oil is then cooled and filtered under pressure with nitrogen gas.

Several of our examples were tested in this manner and the oil colors were determined by the use of the same double monochromator spectrophotometer described above. Sample X is presented as a basis of comparison with the examples of this disclosure. The powdered clay passed 100 mesh screen.

Table III

|  | Wavelength | | | | | | | |
| --- | --- | --- | --- | --- | --- | --- | --- | --- |
|  | 500 | 560 | 620 | 650 | 680 | 710 | 740 | 770 |
| Sample X | 2.0 | 16.0 | 56.1 | 71.2 | 80.9 | 86.9 | 90.8 | 93.2 |
| Clay of Example No. 10 | 3.0 | 36.2 | 77.0 | 86.3 | 92.2 | 94.8 | 97.0 | 97.8 |
| Clay of Example No. 6 | 2.0 | 25.2 | 70.0 | 83.1 | 90.9 | 94.7 | 97.0 | 98.3 |
| Clay of Example No. 5 | 2.0 | 23.0 | 68.2 | 82.2 | 90.0 | 94.1 | 97.0 | 98.1 |
| Clay of Example No. 7 | 1.5 | 22.1 | 64.7 | 79.0 | 87.0 | 91.8 | 95.0 | 97.0 |
| Clay of Example No. 8 | 1.5 | 19.8 | 62.4 | 76.3 | 85.7 | 91.0 | 93.8 | 95.8 |

It will therefore be seen that this invention provides important improvements in processes of treating clays. As indicated above, the clays are adapted for use in treating vegetable, animal, and mineral oils to remove color-forming and other impurities. It will be understood, however, that the clays are not limited to such uses and may be used in other cases, particularly where their improved adsorptive capacity directly or indirectly affects their value.

As illustrated in the examples, the inorganic gel may be introduced into the clay in various proportions. The optimum amount to be used will depend upon the specific character of the other steps of the process, and the use to which the clay is to be put. For most purposes it is sufficient to employ 20 per cent by weight of the dry gel based on the weight of the clay, and in general it may be stated that 5 to 10 per cent of the gel will produce the desired results. We prefer to add the inorganic gel as such or to add the gel by adding materials which are later converted into the gel, but in certain cases it may be incorporated in the clay by being formed in situ from the metals present in the clay.

In preparing a clay dispersion to extend and clean the surface of the clay, dispersing agents are used which are effective to produce a better dispersion than is possible with the use of water alone. The dispersing agents are believed to act to promote the separation of the minute colloidal crystal sheets (primary particles), and, therefore, any agent functioning to produce this result may be used. We prefer to employ in the first instance alkaline materials which contain exchangeable metallic bases; i. e., bases which can be exchanged for bases present in the natural clay and can be removed by leaching with mineral acid. The bases in the natural clay which can be replaced by other bases or removed, in part at least, from the clay by leaching with acid are other examples of exchangeable metallic bases.

The preferred agents are alkaline alkali metal compounds, particularly alkaline sodium compounds. The compounds of this type which have been found to be especially useful are hydroxides and salts, such as carbonates, whose acid radicals form substantially water-insoluble salts with calcium and magnesium. These compounds may be augmented by the use of polyphosphate deflocculating agents, such as tetrasodium pyrophosphate and sodium hexametaphosphate. In some cases, the action of a strongly alkaline polyphosphate deflocculating agent may be sufficient to accomplish the dispersion without the use of another alkaline material.

Although a Texas sub-bentonite is employed in the examples it will be understood that other activable, sub-bentonite clays may be treated with advantage by the process. In treating a particular clay the amount of reagents used and those preferably employed will depend not only upon the use to which the clay is to be put but also upon the characteristics of the clay, such as the pH of aqueous dispersions of the clay.

Since in cases where a mineral acid is used to disperse or extend the area of a clay, the clay should be in finely divided form, we prefer to subject the clay to an alkaline treatment first; this treatment comprising, for example, dispersing the clay in an alkaline solution and removing larger particles by means such as settling or centrifuging. The acid to be used in effecting the dispersion of the clay is a mineral acid such as hydrochloric or sulfuric acid, as pointed out above. Various strengths and amounts of acids may be used; for example, either concentrated or relatively dilute solutions of these acids may be used depending upon the specific result desired. In general, the process may be carried out with from about 5 to 20 per cent sulfuric acid or 4 to 15 per cent hydrochloric acid, in amounts ranging from 20 to 50 per cent based on the weight of the clay.

When an alkaline dispersion of a clay is treated with an acid or an acid dispersion with an alkaline material for the purpose of forming metallic oxides in highly dispersed form, conditions should be adjusted so as to result in a composition having a pH between about 5 and 7. Under other conditions a gel-forming metal such as aluminum may be wholly or partly in the form of an aluminate or a soluble aluminum salt.

Although oxides of silicon and aluminum have been stressed in the above description, it is apparent that other inorganic oxides in highly dispersed or colloidal form may be used, and specific mention may be made of iron and chromium oxides.

In some cases where relatively strong clay aggregates are desired, a treated clay, in which a gelatinous inorganic oxide has already been incorporated, may be mixed with a strong acid to reduce the pH to a low point (e. g. to a pH of 1 to 3), resulting in the flocculation of the clay particles. The product obtained then may be washed and dried, preferably slowly with a current of air, to yield a hard granular clay which can be ground and screened to obtain particles of the desired size. These particles are preferably treated with strong and then with weak acid at varying temperatures as described above.

The strong acid used in a treatment of this type and in similar treatments preferably contains multivalent metallic ions, such as iron or aluminum ions. For example, spent sulfuric acid used in a final acid treatment is valuable for this purpose. The metallic ions have been found to reduce the amount of undesirable redispersion of the clay in this step.

When after an alkaline clay dispersion has been prepared, for example, after the clay has been converted to a sodium clay, and an acid is employed to neutralize the clay either in preparation for the addition of a metallic oxide gel or to function to form such a gel due to the prior or later addition of a salt that can be converted into the gel by the action of acid, it is preferred to employ hydrochloric acid. While other acids such as acetic acid or sulfuric acid may be used for this purpose, hydrochloric acid appears to assist in the aging of the gel. Since exchangeable bases present in the clay are largely soluble in the form of chlorides, after the acid treatment these bases, as chlorides, may readily be washed from the clay.

Obviously many modifications and variations of the invention, as hereinbefore set forth, may be made without departing from the spirit and scope thereof, and therefore only such limitations should be imposed as are indicated in the appended claims.

We claim:

1. The process of treating an activable, non-swelling clay containing montmorillonite to improve the adsorptive characteristics thereof which comprises converting said non-swelling clay into a swelling clay by suspending the clay in a dilute aqueous medium having a pH of at least 8.5 and containing a small amount of a dispersing agent furnishing alkali metal ions that promotes the separation of the primary particles of the clay for a period of time sufficient to produce a substantially completely dispersed and hydrated clay, incorporating an inorganic gel in the clay while in the highly dispersed and hydrated state, and drying the dispersed and hydrated clay containing the inorganic gel to produce a clay product of improved adsorptive characteristics.

2. The process of treating an activable, non-swelling clay containing montmorillonite to improve the adsorptive characteristics thereof which comprises the steps of converting said non-swelling clay into a swelling clay by suspending the clay in a dilute aqueous medium containing a small amount of an alkaline material to yield an aqueous composition having a pH of at least 8.5, permitting the resulting aqueous composition to stand for a period of a plurality of days sufficient to produce a substantially completely dispersed and hydrated clay, incorporating an inorganic gel in the clay while in the highly dispersed and hydrated state, and drying the clay containing the inorganic gel to produce a clay product of improved adsorptive characteristics.

3. The process of treating an activable, non-swelling clay containing montmorillonite to improve the adsorptive characteristics thereof which comprises the steps of converting said non-swelling clay into a swelling clay by dispersing the clay in a dilute aqueous medium containing a small amount of an alkaline material furnishing alkali metal ions to yield an aqueous composition having a pH of at least 8.5 and produce a substantially completely dispersed and hydrated clay, incorporating a gelatinous inorganic oxide in the dispersed and hydrated acid clay, and drying the clay containing the gelatinous inorganic oxide to produce a clay product of improved adsorptive characteristics.

4. The process of treating an activable, non-swelling clay containing montmorillonite to improve the adsorptive characteristics thereof which comprises the steps of converting said non-swelling clay into a swelling clay by adding to a dispersion of the clay in water a small amount of an alkaline compound of sodium in amount sufficient to raise the pH to at least 8.5, said dispersion also containing anions that produce substantially water-insoluble salts with calcium and magnesium, to produce a substantially completely dispersed and hydrated clay, adding a gelatinous inorganic oxide to the clay while in the highly dispersed and hydrated state, acidifying the resulting composition to convert the clay to an acid clay, and drying the clay containing the gelatinous inorganic oxide to produce a clay product of improved adsorptive characteristics.

5. The process of treating an activable, non-swelling clay containing montmorillonite to improve the adsorptive characteristics thereof which comprises the steps of converting said non-swelling clay into a swelling clay by adding to a dispersion of clay in water sodium carbonate in amount sufficient to raise the pH to at least 8.5, to produce a highly dispersed and hydrated clay and precipitate water-insoluble metallic carbonates, adding a gelatinous inorganic oxide selected from the group consisting of alumina and silica to the clay while in the highly dispersed and hydrated state, acidifying the resulting composition to convert the clay to an acid clay, and drying the clay containing the gelatinous inorganic oxide to produce a clay product of improved adsorptive characteristics.

6. The process of treating an activable, non-swelling clay containing montmorillonite to improve the adsorptive characteristics thereof which comprises the steps of converting said non-swelling clay into a swelling clay by adding to a dispersion of clay in water sodium carbonate in amount sufficient to raise the pH to at least 8.5, to produce a highly dispersed and hydrated clay, adding silica gel to the clay while in the highly dispersed and hydrated state, acidifying the resulting composition to convert the clay to an acid clay, and drying the clay containing the silica gel to produce a clay product of improved adsorptive characteristics.

7. The process of treating an activable, non-swelling clay containing montmorillonite to improve the adsorptive characteristics thereof which comprises the steps of converting said non-swelling clay into a swelling clay by adding to a dispersion of clay in water an alkaline sodium compound in amount sufficient to raise the pH to at least 8.5, also adding a sodium polyphosphate deflocculating agent, to produce a highly dispersed and hydrated clay, adding a gelatinous inorganic oxide selected from the group consisting of alumina and silica to the clay while in the highly dispersed and hydrated state, acidifying the resulting composition to convert the clay to an acid clay, and drying the clay containing the gelatinous inorganic oxide to produce a clay product of improved adsorptive characteristics.

8. The process of treating an activable, non-swelling clay containing montmorillonite to improve the adsorptive characteristics thereof which comprises the steps of converting said non-swelling clay into a swelling clay by dispersing the clay in an aqueous medium in the presence of an alkaline dispersing agent to produce a highly dispersed and hydrated clay, adding a gelatinous inorganic oxide to the dispersed and hydrated clay, subjecting the resulting composition to partial drying to convert the composition into a product containing grains larger than 200 mesh, and treating with acid to convert the clay into an acid clay while preserving the grain sizes substantially in the range larger than 200 mesh.

9. The process of treating an activable, non-swelling clay containing montmorillonite to improve the adsorptive characteristics thereof which comprises the steps of converting said non-swelling clay into a swelling clay by dispersing the clay in an aqueous medium in the presence of an alakline sodium compound, the alkaline sodium compound being present in amount sufficient to raise the pH to at least 8.5 and yield a highly dispersed and hydrated clay, incorporating a gelatinous inorganic oxide in the dispersed and hydrated clay, subjecting the resulting composition to partial drying to convert the composition into a product containing grains larger than 200 mesh, treating said product with a strong mineral acid and then with a dilute solution of an acid while heating and while maintaining the grain sizes, and drying the resulting acid treated product to produce a clay product composed of hard grains of improved adsorptive characteristics.

10. The process of treating an activable, non-swelling clay containing montmorillonite to improve the adsorptive characteristics thereof which comprises the steps of suspending the clay in an aqueous medium in the presence of a dispersing agent that promotes the separation of the primary particles of the clay for a period of time sufficient to produce a highly dispersed and hydrated clay, incorporating an inorganic gel in the clay while in the highly dispersed and hydrated state, partially drying the dispersed and hydrated clay containing the inorganic gel until a product is produced having grains substantially larger than 200 mesh, adding a mineral acid to the product in concentration of at least 35 per cent, permitting the acid to diffuse into the clay grains, adding water to the resulting mixture to yield an acid concentration substantially less than 35 per cent, and heating the mixture, the treatment with said mineral acid, the addition of water, and the heating being accomplished while maintaining the grain sizes substantially in the range larger than 200 mesh, and finally drying to produce a clay product of improved adsorptive characteristics composed of hard grains substantially in the range larger than 200 mesh.

11. The process of treating an activable, non-swelling clay containing montmorillonite to improve the adsorptive characteristics thereof which comprises the steps of partially drying a mixture of the clay in the highly dispersed state, silica gel, and water, the water constituting substantially more than 30 per cent of the mixture by weight, the drying being stopped when the mixture contains at least 30 per cent water, subdividing the mixture to produce a product containing grains not substantially smaller than 100 mesh, adding sulfuric acid to the product in concentration of at least 35 per cent, adding water to the resulting mixture to yield an acid concentration of substantially less than 35 per cent, heating the mixture, the treatment with said sulfuric acid, the addition of water, and the heating being accomplished while maintaining the grain sizes substantially in the range larger than 100 mesh, and drying to produce a clay product of improved adsorptive characteristics composed of hard grains substantially in the range larger than 100 mesh.

12. The process of treating an activable, non-swelling clay containing montmorillonite to improve the adsorptive characteristics thereof which comprises the steps of dispersing the clay in water, adding sodium carbonate in amount to raise the pH of the dispersion to at least 8.5, also adding a sodium polyphosphate selected from the group consisting of sodium pyrophosphate and sodium hexametaphosphate, introducing hydrochloric acid into the dispersion until slightly acid, adding silica gel to the slightly acid dispersion in amount to yield about 10 per cent by weight of the final product, partially drying the resulting mixture until the water content is about 40 per cent, subdividing the partially dried mixture to produce a product having grains larger than 100 mesh, mixing the product with sulfuric acid of at least 35 per cent concentration in amount adapted to thoroughly wet the grains, adding water to reduce the acid concentration to about 10 per cent, boiling the mixture, washing the mixture to remove sulfate ions, and drying the washed mixture, the treatment with sulfuric acid, addition of water, boiling and washing being accomplished while maintaining the grain sizes substantially in the range larger than 100 mesh, to produce a clay product of improved adsorptive characteristics composed of hard grains substantially in the range larger than 100 mesh.

ALLEN D. GARRISON.
KARL C. TEN BRINK.